(12) United States Patent
Pilpel et al.

(10) Patent No.: US 9,278,501 B2
(45) Date of Patent: Mar. 8, 2016

(54) COMPOSITE COATED SUBSTRATES AND MOLDABLE COMPOSITE MATERIALS

(71) Applicant: Gordon Holdings, Inc., Englewood, CO (US)

(72) Inventors: Edward Pilpel, Avon, CT (US); Michael Gordon, Montrose, CO (US)

(73) Assignee: Gordon Holdings, Inc., Englewood, CO (US)

( * ) Notice: Subject to any disclaimer, the term of this patent is extended or adjusted under 35 U.S.C. 154(b) by 0 days.

(21) Appl. No.: 14/224,454

(22) Filed: Mar. 25, 2014

(65) Prior Publication Data

US 2014/0205833 A1    Jul. 24, 2014

Related U.S. Application Data

(62) Division of application No. 12/412,478, filed on Mar. 27, 2009.

(60) Provisional application No. 61/039,825, filed on Mar. 27, 2008.

(51) Int. Cl.

| B32B 7/12 | (2006.01) |
|---|---|
| B29B 17/00 | (2006.01) |
| B29C 70/08 | (2006.01) |
| B29C 70/12 | (2006.01) |
| C08J 5/04 | (2006.01) |
| B29K 101/10 | (2006.01) |
| B29K 101/12 | (2006.01) |
| B29K 105/06 | (2006.01) |

(52) U.S. Cl.
CPC .............. *B32B 7/12* (2013.01); *B29B 17/0042* (2013.01); *B29C 70/081* (2013.01); *B29C 70/12* (2013.01); *C08J 5/04* (2013.01); *C08J 5/047* (2013.01); *B29K 2101/10* (2013.01); *B29K 2101/12* (2013.01); *B29K 2105/06* (2013.01); *Y02W 30/62* (2015.05); *Y10T 428/24132* (2015.01); *Y10T 428/25* (2015.01); *Y10T 428/2982* (2015.01); *Y10T 428/31504* (2015.04)

(58) Field of Classification Search
CPC .............. B32B 7/12; C08J 5/047; C08J 5/04; B29C 70/081; B29C 70/12; B29B 17/0042; B29K 2105/06; B29K 2101/10; B29K 2101/12; Y10T 428/24132; Y10T 428/25
See application file for complete search history.

(56) References Cited

U.S. PATENT DOCUMENTS

| 3,944,639 A | 3/1976 | Osajima et al. |
|---|---|---|
| 5,681,194 A | 10/1997 | Baker |
| 5,879,601 A | 3/1999 | Baker |
| 7,223,476 B2 | 5/2007 | Edwards et al. |
| 2002/0016399 A1 | 2/2002 | Mazur |
| 2003/0125399 A1 | 7/2003 | Zhang et al. |
| 2005/0281999 A1 | 12/2005 | Hofmann et al. |
| 2006/0004113 A1 | 1/2006 | Kimura et al. |

FOREIGN PATENT DOCUMENTS

| CA | 2549844 A1 | 11/2007 |
|---|---|---|
| CN | 1741896 A | 3/2006 |
| EP | 1892072 A1 | 2/2008 |
| FR | 2740149 A1 | 4/1997 |
| GB | 2216531 A | 10/1989 |
| JP | Sho57-038011 | 8/1955 |
| JP | 08142273 A | 6/1996 |
| JP | 09109310 A | 4/1997 |
| JP | 09110494 A | 4/1997 |
| JP | 2005288899 A | 10/2005 |
| WO | 9106410 A1 | 5/1991 |
| WO | 2004067246 A2 | 8/2004 |
| WO | 2006071518 A1 | 7/2006 |

OTHER PUBLICATIONS

Partial International Search Report for PCT/US2009/038491, dated Jul. 24, 2009.
International Search Report for PCT/US2009/038491, dated Sep. 4, 2009.
English translation of First Office Action issued in corresponding Japanese Patent Application No. JP2011-502086, dated Jul. 17, 2013, pp. 1-4.
English translation of Second Office Action issued in corresponding Japanese Patent Application No. JP2011-502086, dated Mar. 25, 2014, pp. 1-3.
English translation of Notice of First Office Action issued in corresponding Chinese Patent Application No. CN200980110998.8, dated Oct. 8, 2012, pp. 1-8.
English translation of Notice of Second Office Action issued in corresponding Chinese Patent Application No. CN200980110998.8, Nov. 21, 2013, pp. 1-7.

(Continued)

*Primary Examiner* — Robert Jones, Jr.
(74) *Attorney, Agent, or Firm* — MKG LLC

(57) ABSTRACT

A moldable composite material contains flakes of composite material, i.e., flakes of polymeric matrix materials having fibers embedded therein. An improved substrate is provided by providing a substrate and applying a coating onto the substrate, the coating containing the flakes of composite material. A first construction member can be secured to a second construction member by applying the coating onto an attachment region of the first construction member, and applying a fastener onto the first construction member in the coated attachment region to secure the first construction member to the second construction member.

8 Claims, 2 Drawing Sheets

(56) References Cited

OTHER PUBLICATIONS

Communication issued in corresponding European Patent Application No. EP09725153.2, dated Mar. 18, 2014.
English et al., "Waste Wood-Derived Fillers for Plastics", 1996, pp. 1-15.
Dutta et al., "Composite Grids for Reinforcement of Concrete Structures" 1998, pp. 4-8.
Conroy, et al., "Composites: Part A" 2006, pp. 1216-1222.
Office Action for Canadian Patent Application No. 2853570, dated Sep. 5, 2014.
English translation of Decision of Rejection issued in corresponding Chinese Patent Application No. CN200980110998.8, dated Jul. 7, 2014, pp. 1-7.
Office Action for European Patent Application No. 09725153.2, dated Jul. 15, 2015, 6 pages.
Office Action for European Patent Application No. 09725153.2, dated Dec. 23, 2014.

COMPOSITE COATED SUBSTRATES AND MOLDABLE COMPOSITE MATERIALS

CROSS-REFERENCE TO RELATED APPLICATION

This application is a divisional application of and claims priority benefit under 35 U.S.C. §120 to U.S. patent application Ser. No. 12/412,478, filed Mar. 27, 2009 now U.S. Pat. No. 8,962,737, which claims priority benefit under 35 U.S.C. §119(e) of U.S. Provisional Patent Application No. 61/039,825 filed Mar. 27, 2008, the disclosure of both applications are incorporated by reference herein in their entireties.

FIELD OF THE INVENTION

This invention relates to hybrid materials that employ composites to coat a substrate or form a moldable material.

BACKGROUND

Building materials, and other substrates, are often exposed to wear, sunlight, weather, and insects, causing the materials to deteriorate quickly. The cost of wood, and other materials, has also increased significantly in recent years. The desire to reuse or recycle materials is also a greater focus in "green" building. In addition, traditional building materials sometimes exhibit insufficient mechanical properties when exposed to high loads, for example, high winds or shock waves from explosive blasts. In such instances, where traditional building materials are employed, significant destruction, injury, and even loss of life are possible.

SUMMARY OF THE INVENTION

The present invention resides in one aspect in a moldable composite material that contains flakes of composite material.

The present invention resides in another aspect in a method for making an improved substrate. The method is practiced by providing a substrate and applying a coating onto the substrate, the coating comprising flakes of composite material.

The present invention resides in yet another aspect in a method for securing a first construction member to a second construction member, by applying a coating onto an attachment region of the first construction member, and applying a fastener onto the first construction member in the coated attachment region to secure the first construction member to the second construction member.

The invention also provides, in another aspect, an improved substrate. The improved substrate includes a substrate and a coating on the substrate, the coating comprising a plurality of flakes of composite material.

DETAILED DESCRIPTION OF THE INVENTION

The present invention is directed in one aspect to a moldable material comprised of flakes of a composite material. A composite material includes fibers embedded in a polymeric matrix. Composite materials can optionally be made in the form of sheets, continuous rolls or other forms. To provide flakes, a composite material may be chopped, cut or otherwise divided into flakes that may have various lengths, e.g., about 1 to about 6 inches (in.) [about 2.5 to about 15.25 centimeters (cm)] long, and various widths, e.g., about ¼ to about 3 in. (about 0.6 to about 7.6 cm) wide. However, the present invention is not limited in this regard as any practical flake size can be used.

In one embodiment, the moldable material includes a mixture of flakes of composite material with filler. The filler may comprise flakes of any one or more substrate materials, including, for example, building materials or other materials, such as wood, wood flakes, sawdust, plastic, metal, composites or textiles. The composite flakes may be mixed with substrate pieces or other filler so that the composite flakes are somewhat evenly distributed throughout the mixture. Adhesive can optionally be included to bind the composite flakes with the substrate flakes. Alternatively, the composite flakes may be used without substrate flakes to form a moldable material. The moldable material may comprise substantially free-flowing flakes or flakes that have been consolidated into a useful precursor form, e.g., pellets, by application of heat and/or pressure. When the matrix material in a thermoplastic, if two or more flakes are touching one another when exposed to sufficient heat and/or pressure the polymeric matrix materials therein can at least partially melt, thereby causing the matrix material to act as soon as an adhesive and the flakes to bond to one another.

In another embodiment, the invention provides an improved substrate achieved by applying a coating on a substrate, such as a construction member, the coating having been made from the flakes of composite material described herein. The substrate may comprise, for example, wood, plastic, metal, a plywood sheet, cut lumber, pressboard, particle board, oriented strand board, etc., or a formed material such as a honeycomb, or a combination thereof. The term substrate may include any type of material and is not to be limited to the above disclosed materials.

Figure 1:
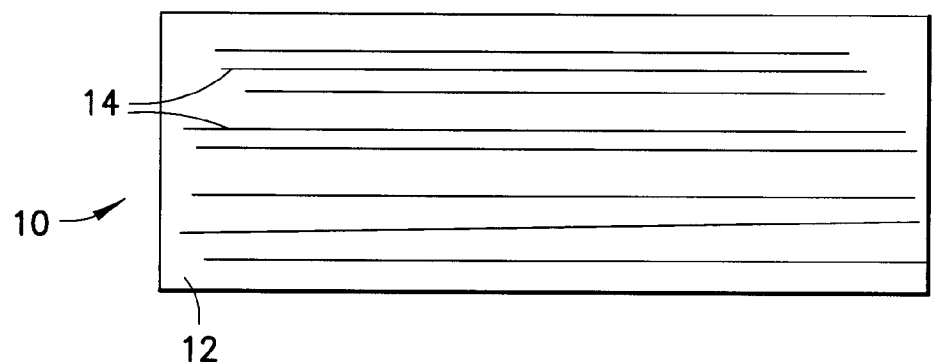
FIG. 1 is a schematic top view of a flake of composite material having continuous, unidirectionally oriented fibers.
Figure 2:
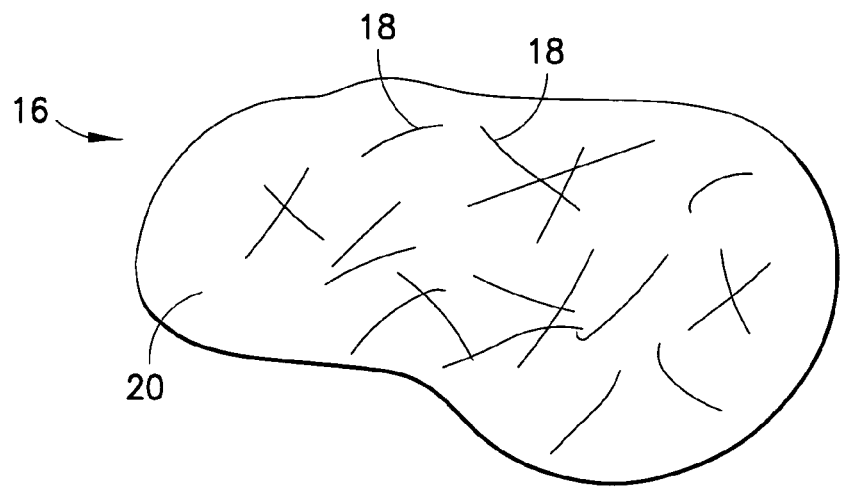
FIG. 2 is a schematic top view of a flake of composite material having chopped randomly oriented fibers.

In one embodiment shown in FIG. 1, a flake of composite material generally designated at 10 includes a polymeric matrix 12 and a plurality of mutually longitudinally aligned fibers 14 located within the polymeric matrix. A flake, sheet, fragment, laminate or ply of composite material may be characterized as "unidirectional" in reference to the principally unidirectional orientation of the fibers therein, as seen in flake 10. In addition, while flake 10 is rectangular, the present invention is not limited in this regard as a flake of composite material can be any shape without departing from the broader aspects of the present invention. In addition, the fibers can be longitudinally oriented in the polymer matrix, or chopped and randomly oriented in the polymer matrix, or a combination thereof. For example, the flake 16 shown in FIG. 2 is randomly shaped and comprises fibers 18 forming which are chopped from longer strands and are randomly oriented in the polymer matrix 20. In addition, and rather than instead of the number of fibers, the composite material can employ particulate material.

Various types of fibers or particulate may be used in a composite material. Exemplary fibers include E-glass and S-glass fibers. E-glass is a low alkali borosilicate glass with good electrical and mechanical properties and good chemical resistance. This type of glass is the most widely used in fibers for reinforcing plastics.

S-glass is the higher strength and higher cost material relative to E-glass. S-glass is a magnesia-alumina-silicate glass for aerospace applications with high tensile strength. Originally, "S" stood for high strength.

E-glass fiber may be incorporated in the composite in a wide range of fiber weights and thermoplastic polymer matrix material. The E-glass may range from about 10 to about 40 ounces per square yard (oz./sq. yd.), for example, 19 to 30 or, in a particular embodiment, 21.4 to 28.4 oz./sq. yd.

Other fibers may also be incorporated, optionally in combination with E-glass and/or S-glass. Such other fibers include ECR, A and C glass, as well as other glass fibers; fibers formed from quartz, magnesia aluminosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers, asbestos, boron, silicone carbide, graphite and carbon such as those derived from the carbonization of polyethylene, polyvinylalcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

One suitable organic polymer fiber is formed from an aramid exemplified by Kevlar. Other high performance, unidirectional fiber bundles generally have a tensile strength greater than 7 grams per denier. These bundled high-performance fibers may be any one of, or a combination of, aramid, extended chain ultra-high molecular weight polyethylene (UHMWPE), poly[p-phenylene-2,6-benzobisoxazole] (PBO), and poly[diimidazo pyridinylene(dihydroxy)phenylene] (M5). The use of these very high tensile strength materials is particularly useful for making composite ballistic armor panels and similar applications requiring very high ballistic properties.

Still other fiber types known to those skilled in the particular art to which the present invention pertains can be substituted without departing from the broader aspects of the present invention. For example, Aramid fibers such as, inter alia, those marketed under the trade names Twaron, and Technora; basalt, carbon fibers such as those marketed under the trade names Toray, Fortafil and Zoltek; Liquid Crystal Polymer (LCP), such as, but not limited to LCP marketed under the trade name Vectran. Based on the foregoing, the present invention contemplates the use of organic, inorganic and metallic fibers either alone or in combination.

The quantity of S-glass, E-glass or other fiber in a composite material may optionally accommodate about 40 to about 90 weight percent (wt %) thermoplastic matrix, for example about 50 to about 85 wt % and in one embodiment about 60 to about 80 wt % thermoplastic matrix in the ply, based on the combined weight of thermoplastic matrix plus fiber.

The polymeric matrix material may comprise a thermoplastic polymeric material (providing a "thermoplastic flake"), a thermosetting polymeric material (providing a "thermosetting flake"), or a combination thereof. A thermoplastic polymeric matrix may comprise a polymer that may be a high molecular weight thermoplastic polymer, including but not limited to, polypropylene, polyethylene, nylon, PEI (polyetherimide) and copolymers. Thermoplastic loading by weight can vary widely depending on physical property requirements of the intended use of the product sheet.

Flakes used in the present invention can include flakes made exclusively from a single composite material, or the flakes can be made from composite materials that differ from each other with respect to the fibers and/or with respect to the polymer matrix therein. For example, a thermoplastic polymer, or a combination thereof are each different matrix materials from the other. In addition, one type of thermoplastic or thermosetting polymer matrix may be different from another type of thermoplastic or thermosetting polymer matrix, respectively. Thus, thermoplastic polyethylene is different from thermoplastic polypropylene, etc.

Figure 3:
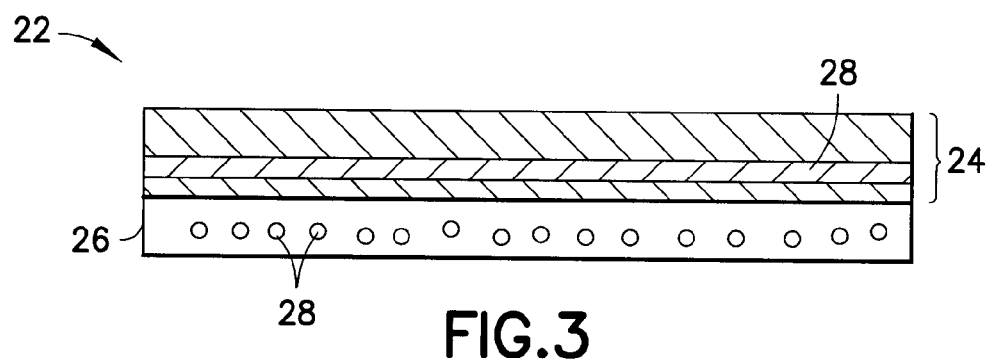
FIG. 3 is a side schematic view of a laminated flake of composite material.

In one embodiment, the composite material is a laminate which includes at least one composite layer or ply, a composite layer being a single layer comprising a polymer matrix with fibers therein. Optionally, a laminate of two or more composite layers may contain composite layers that differ from each other with respect to the fibers and/or with respect to the polymer matrix therein. For example, the flake 22 shown in FIG. 3 is formed from a laminate of two composite layers 24 and 26. In the illustrated embodiment, each of the composite layers 24 and 26 includes oriented continuous fibers 28. The fibers 28 in one of the layers 24 and 26 are oriented substantially orthogonally to the fibers in the other layer. However, the present invention is not limited in this regard as the fibers 28 in each layer can be oriented at any angle relative to one another. In addition, the fibers in each layer can be of different material and can also be chopped, continuous, aligned, randomly oriented, and combinations thereof. While the flake 22 has two layers, the present invention is not limited in this regard as any practical number of layers of composite material may comprise the flake without departing from the broader aspects of the present invention.

Figure 4:
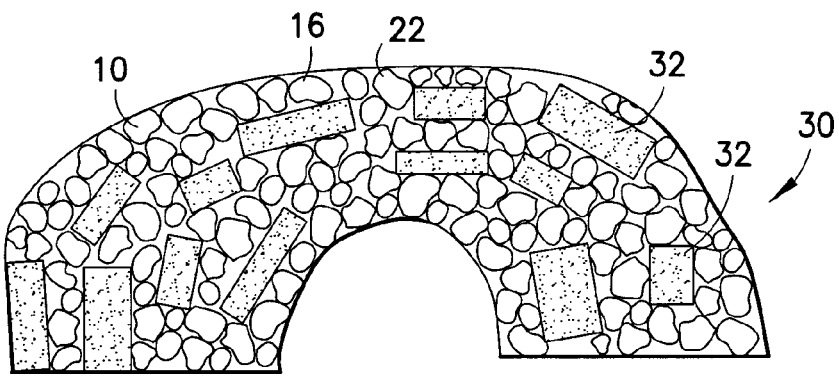
FIG. 4 schematically illustrates a moldable composite material formed from substrate pieces and composite material flakes.

The flakes 10, 16 and/or 22 can be accumulated into a moldable composite material which can be molded using standard molding techniques, e.g., injection molding, blow molding, compression molding, film insert molding, rotational molding, thermoforming, etc., to produce a molded product 30 as shown in FIG. 4. Optionally, the molding process may include the application of heat and/or pressure to cause adjacent flakes 10, 16, 22 to at least partially melt or set, and bond to one another. Optionally, the moldable composite material includes fillers, processing additives, etc. In one embodiment, as shown in FIG. 4, the flakes 10, 16, and 22 are combined with pieces of substrate material 32 as filler to provide the moldable composite material. The substrate pieces may include for example, wood flakes, sawdust, metals, or any other substrate, and any combination thereof. The flakes 10, 16, and/or 22 are mixed with the substrate pieces 32 so the flakes are somewhat evenly distributed throughout the mixture, which may then be molded into any desired shape, for example, into a configuration having a semicircular cross-section as illustrated in FIG. 4. In one embodiment, an adhesive may be added to the moldable composite material to improve adherence between the substrate material 32 and the flakes 10, 16, 22.

In another embodiment, the moldable composite material may be formed from one or more flakes 10, 16, and/or 22 and fibers, substantially without substrate flakes or particles, and in another embodiment, the moldable composite material may be formed entirely from flakes 10, 16, and/or 22, substantially without additional fibers or flakes or particles of substrate material or other filler.

In an alternative embodiment of the present invention, flakes 10, 12 and/or 22 can be concentrated and/or additionally coated in particular areas of the molded product 30. For example, the flakes of composite materials can be concentrated along edge portions or other regions of the molded product 30 as the addition of the composite material may enhance the fastener retention properties, or other properties, of the molded product. In an alternative embodiment of the present invention, flakes 10, 16, and/or 22 can be additionally coated in particular areas of the molded product 30.

In some of the above-described embodiments, the flakes 10, 16, and/or 22 can be formed from larger pieces of the composite material that are subsequently chopped or otherwise cut into the flakes. If the fibers that are in the composite material are oriented in a particular direction, the flakes can also be positioned in the moldable material or on the substrate so that the flake orientation and thereby the fiber orientation enhances the mechanical properties of the coated substrate or moldable material.

Figure 5:
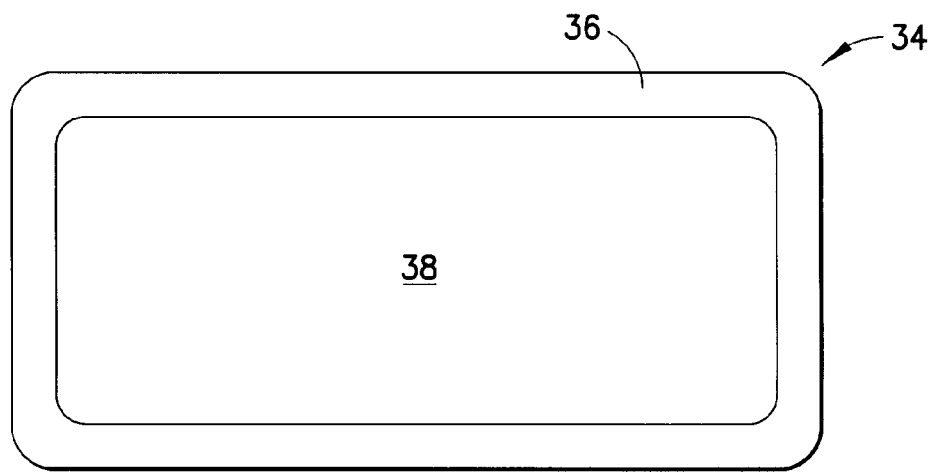
FIG. 5 schematically illustrates flakes of composite material concentrated around the periphery of a substrate.
Figure 6:
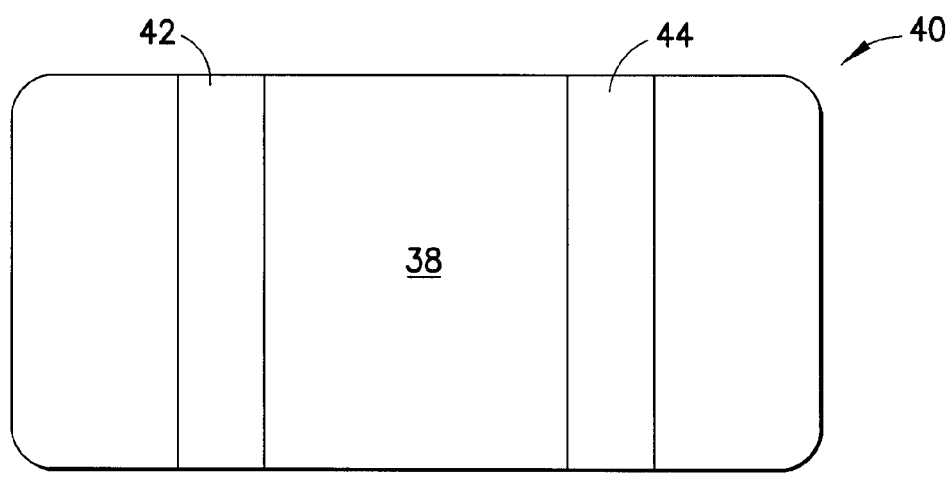
FIG. 6 schematically illustrates flakes of composite material concentrated in rows on a substrate.

According to another aspect, flakes of composite material may be applied as a coating onto a substrate. As indicated above, the substrate may be wood, including lumber, metal, or any other members. In one embodiment, the substrate is a structural construction material such as plywood, framing lumber, panel board, etc. For example, as shown in FIGS. 5 and 6, an improved substrate 34 is provided by applying a coating 36 onto a substrate 38. The coating 36 is made from flakes 10, 16, and/or 22, is applied onto selected areas of a substrate 38, in particular, along the peripheral edges of the substrate to provide a an improved substrate 34. The coating 36 may be applied onto the substrate 38 by rendering the flakes 10, 16 and/or 22 in a flowable form, e.g., as the moldable composite material, or in a paint-like suspension in a volatile carrier fluid, etc., and applying the flowable composition onto the substrate 38 in the desired areas, an allowing the coating to congeal and/or cure. The coating 36 enhances the capability of the substrate 38 to retain a fastener (not shown), such as, but not limited to a screw or a nail. Alternatively, and as shown in FIG. 6, an improved substrate 40 has coatings 42 and 44 comprising flakes 10, 16 and/or 22 which are disposed in rows along the substrate 38 in areas where fasteners would normally be placed.

The present invention is not limited to a coatings concentrated along peripheral edges or in rows on a substrate. Rather, a coating of flakes 10, 16, and/or 22 can be applied over a variety of specific areas or over the entire surface of a substrate without departing from the broader aspects of the present invention.

The coatings 36, 42, and/or 44 may be applied as single layers, but the invention is not limited in this regard, and in other embodiments, various numbers of layers may be applied over the entirety or just a portion of the substrate. Optionally, discrete layers of flakes 10, 16, and/or 22 on a substrate may be incorporated such that flakes of one type comprise a first coating on a substrate, followed by different types of flakes applied as a second coating on a substrate.

In other embodiments, it may be useful to coat the entirety of a substrate 38 in a single layer of composite material, while adding additional layers to areas requiring reinforcement. Furthermore, the coating 36 can be applied so that the fibers therein are aligned relative to one another in a particular direction. For example, oblong unidirectional flakes 10 having fibers aligned in the lengthwise direction can be applied onto a substrate 38 in a manner that allows the flakes 10 to align with each other. Without wishing to be bound by any particular theory, it is believed that by aligning the fibers 14 in a particular direction, the substrate should be strengthened in that direction.

Optionally, an adhesive may be added to the flakes 10, 16, and/or 22 in a coating 36, 42 and/or 44, or in a moldable composite material, to improve adherence between the flakes themselves (optionally including substrate flakes 32) and/or between the flakes 10, 16, and/or 22 and a substrate 38 on which the flakes are disposed. In addition, if two or more of the flakes 10, 16, and/or 22 are touching one another, the present invention encompasses heat and pressure to cause the composite material to at least partially melt or cure, thereby causing the composite flakes to bond to one another to form a coating on a substrate.

In some embodiments of the present invention, the flakes 10, 16, and/or 22 are used to form a layer of composite material coating substantially an entire substrate surface to the mechanical properties and durability of the overall substrate. Assuming the fibers in the flakes are parallel and longitudinally oriented, as in flakes 10, and depending on the desired mechanical properties of the improved substrate, the flakes can be oriented onto the substrate so that the fibers are substantially oriented in a particular direction.

One advantage of one embodiment is that substrate coating and the moldable material can utilize flakes 10, 16, and/or 22 made from waste, recycled, or scrap composite material.

Another advantage of one embodiment of a composite coating and moldable material of the present invention is that the flakes 10, 16, and/or 22 can be employed to enhance the mechanical properties of the moldable material or coated substrate of the present invention. These enhancements can be overall and/or in desired areas and/or directions.

Still another advantage of the composite coating and moldable material of the present invention is that the flakes 10, 16, and/or 22, or a coating 36 thereof, can be concentrated in particular areas to enhance the retention of fasteners, such as, but not limited to, screws and nails, thereby making the moldable material or coated substrate less likely to dislodge from a structure in severe weather or stress conditions.

The advantages set forth above are illustrative only and should not be considered an exhaustive list, as other advantages will be evident to those skilled in the pertinent art to which the present invention pertains.

The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A method for making a coated substrate, comprising:
   providing a substrate; and
   applying a coating onto the substrate, the coating comprising flakes of composite material,
   wherein the flakes of composite material comprise:
   first flakes of a first composite material; and
   second flakes of a second composite material, the first composite material being different from the second composite material,
   wherein the first flakes comprise fibers in a first polymer matrix and the second flakes comprise fibers in a second polymeric matrix, and wherein the first polymer matrix is a thermoplastic material and the second polymer material is a thermosetting material.

2. The method of claim 1, comprising applying the coating that comprises a combination of thermoplastic flakes and thermosetting flakes.

3. The method of claim 1, comprising applying a plurality of layers of the coating on the substrate.

4. The method of claim 1, comprising applying layers of the coating onto the substrate including a first layer primarily comprising thermoplastic flakes and a second layer primarily comprising thermosetting flakes.

5. The method of claim 1, wherein the coating comprises unidirectional flakes that are aligned with each other in the coating.

6. The method of claim 1, wherein the substrate has an attachment region and the method comprises coating primarily the attachment region of the substrate.

7. A method for securing a first construction member to a second construction member, comprising applying a coating onto an attachment region of the first construction member, and applying a fastener onto the first construction member in the coated attachment region to secure the first construction member to the second construction member, the coating comprising flakes of composite material, wherein the flakes of composite material comprise:

first flakes of a first composite material; and second flakes of a second composite material, the first composite material being different from the second composite material, wherein the first flakes comprise fibers in a first polymer matrix and the second flakes comprise fibers in a second polymer matrix, and wherein the first polymer matrix is a thermoplastic material and the second polymer material is a thermosetting material.

8. A coated substrate, comprising:

a substrate; and a coating on the substrate, the coating comprising a plurality of flakes of composite material, wherein the flakes of composite material comprise:

first flakes of a first composite material; and second flakes of a second composite material, the first composite material being different from the second composite material, wherein the first flakes comprise fibers in a first polymer matrix and the second flakes comprise fibers in a second polymeric matrix, and wherein the first polymer matrix is a thermoplastic material and the second polymer material is a thermosetting material.

* * * * *